US012380624B1

(12) United States Patent
Jiang et al.

(10) Patent No.: US 12,380,624 B1
(45) Date of Patent: Aug. 5, 2025

(54) GENERALIZABLE NEURAL RADIATION FIELD RECONSTRUCTION METHOD BASED ON MULTI-MODAL INFORMATION FUSION

(71) Applicant: HANGZHOU CITY UNIVERSITY, Zhejiang (CN)

(72) Inventors: Junjie Jiang, Zhejiang (CN); Anping Wan, Zhejiang (CN); Xiaomin Cheng, Zhejiang (CN); Junhao Huang, Zhejiang (CN); Kaiyang Wang, Zhejiang (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 19/066,191

(22) Filed: Feb. 28, 2025

(30) Foreign Application Priority Data

Dec. 25, 2024 (CN) .......................... 202411926361.9

(51) Int. Cl.
*G06T 15/00* (2011.01)
*G06T 5/70* (2024.01)
*G06T 7/80* (2017.01)
*G06V 10/44* (2022.01)
*G06V 10/80* (2022.01)
*H04N 19/597* (2014.01)

(52) U.S. Cl.
CPC ................ *G06T 15/00* (2013.01); *G06T 5/70* (2024.01); *G06T 7/80* (2017.01); *G06V 10/44* (2022.01); *G06V 10/806* (2022.01); *H04N 19/597* (2014.11)

(58) Field of Classification Search
None
See application file for complete search history.

(56) References Cited

U.S. PATENT DOCUMENTS

| 12,323,593 | B2 * | 6/2025 | Besenbruch | G06N 3/084 |
| 2024/0303487 | A1 * | 9/2024 | Zhang | G06N 3/0455 |
| 2025/0086978 | A1 * | 3/2025 | Bangalore Ravi | B60W 60/001 |
| 2025/0166391 | A1 * | 5/2025 | Han | G06V 20/58 |

* cited by examiner

Primary Examiner — James A Thompson

(57) ABSTRACT

A generalizable neural radiation field reconstruction method based on multi-modal information fusion, including: Step 1, constructing photometric features and geometric features based on unstructured multi-views, and constructing a multi-modal neural encoder by performing incrementally complementary fusion on the photometric features and the geometric features; Step 2, converting the multi-modal neural encoder and raw RGB pixel bodies of the unstructured multi-views into a volume density and radiation brightness; Step 3, sampling light on the basis of the constructed multi-modal neural encoder, aggregating context features of the sampled light based on a transformer network to obtain light context features; and Step 4, decoding, using the light context features, the volume density and the radiation brightness; rendering, based on the decoded volume density and the radiation brightness, to generate a free-view RGB-D image; and guiding dense reconstruction of a low-texture scene by combining photometric supervision and sparse geometric supervision.

9 Claims, 6 Drawing Sheets

GENERALIZABLE NEURAL RADIATION FIELD RECONSTRUCTION METHOD BASED ON MULTI-MODAL INFORMATION FUSION

FIELD

The present disclosure relates to the field of visual image generation, and particularly to a generalizable neural radiation field reconstruction method based on multi-modal information fusion.

BACKGROUND

Scene reconstruction and new view generation based on multi-view visual information are long-standing challenges in computer vision and graphics. In recent years, neural mapping methods have significantly advanced integration and development of the scene reconstruction and the new view generation. By performing a Neural Radiation Field (NeRF) based on implicit 3D reconstruction and subsequent processes thereof, a realistic new view synthesis result can be produced, however, a large number of multi-view images need to be used, in combination with a long-period single-scene perspective optimization process. The NeRF techniques have a significant drawback, which is shape radiation ambiguity. That is, a 3D structure of a scene cannot be explicitly reconstructed with high quality. Another drawback of the NeRF techniques is lack of generalizability, fast rendering across scenes cannot be achieved.

Operations based on a small number of views are highly efficient and can demonstrate potential of neural radiation fields in generalizing inference of geometric and appearance information across scenes. In these methods, recent successes in deep multi-view stereo vision (MVS) are applied, 2D image features from nearby input views (inferred by 2D CNNs) are warped onto a swept plane in a view cone of a reference view, a cost volume is constructed at an input reference view to implicitly perform inference on scene geometry, a true image of a new view is quickly regressed to. Therefore, these methods are highly generalizable, avoiding tedious scene-by-scene optimization. However, when only a small number of views are available, the generalizable neural radiation field surface reconstruction in the art has low accuracy. Especially for complex regions such as boundaries and light-reflective regions, incomplete geometric perception often leads to a 2D view rendering result having low quality.

SUMMARY

The present disclosure aims to provide a generalizable neural radiation field reconstruction method based on multi-modal information fusion. In this way, the shape radiation ambiguity can be solved, high-quality 3D reconstruction and 2D rendering can be achieved, and accuracy of the generalizable neural radiation field surface reconstruction is improved.

The present disclosure provides a generalizable neural radiation field reconstruction method based on multi-modal information fusion, including:

Step 1, constructing photometric features and geometric features based on unstructured multi-views, and constructing a multi-modal neural encoder by performing incrementally complementary fusion on the photometric features and the geometric features;

Step 2, converting the multi-modal neural encoder and raw RGB pixel bodies of the unstructured multi-views into a volume density and radiation brightness;

Step 3, sampling light on the basis of the constructed multi-modal neural encoder, aggregating context features of the sampled light based on a transformer network to obtain light context features; and Step 4, decoding, using the light context features, the volume density and the radiation brightness; rendering, based on the decoded volume density and the radiation brightness, to generate a free-view RGB-D image; and guiding dense reconstruction of a low-texture scene by combining photometric supervision and sparse geometric supervision.

In some embodiments, in the Step 1, constructing the photometric features includes: using a bi-directional fusion backbone network $f^T$ to extract image features; using ConvNext to extract multi-scale semantic information from 4, 8, 16, and 32 times downsampling, wherein the multi-scale semantic information provides overall surface features of a region and a target; extracting shallow localized appearance features at the 4 times downsampling; encoding the unstructured multi-views into semantically-enhanced photometric features $F_i^T$ through bi-directional feature fusion, wherein the semantically-enhanced photometric features $F_i^T$ is as follows:

$$F_i^T = f^T(I_i);$$

wherein the Ii denotes the unstructured multi-views.

In some embodiments, constructing the geometric features includes:

obtaining camera parameters $\Phi=[K, R, t]$ wherein the K is an internal reference matrix of a camera, the R is a rotation matrix of the camera with respect to a world coordinate system, the t is a translation vector of the camera with respect to the world coordinate system; using a homographic transformation matrix $X_i(z)$ to transform 2D features of an i-th auxiliary view to a reference view to obtain photometric features $F_{i,z}^T(u, v)$ at a depth of Z, as follows:

$$Z_I(z) = K_i \cdot \left( R_i \cdot R_I^T + \frac{(t_I - t_i) \cdot n_I^T}{z} \right) \cdot K_I^{-1};$$

wherein the $K_i$, the $R_i$, and the $t_i$ are the camera parameters of the i-th auxiliary view, and the $K_I$, the $R_I$, and the $t_I$ are the camera parameters of the reference view, and the $n_I$ is a normal direction of the reference view;

$$F_{i,z}^W(u,v) = F_i^T \times (\Xi_i(z)[u,v,l]^T);$$

wherein the u, the v, and the l are normalized device coordinates in the reference view;

a photometric variance feature $F^V$ is calculated to explicitly encode an extent of difference between feature points of the multi-views, as follows:

$$F^V(u,v,z) = \text{Var}(F_{i,z}^W(u,v))$$

wherein the Var is a variance function that computes the photometric feature for each spatial point in the reference view;

using a 3D CNN to encode and decode the photometric variance feature $F^V$, wherein the photometric variance feature $F^V$ is converted into an explicit geometric feature $F^\Lambda$ based on a sigmoid operation.

In some embodiments, in the Step 1, constructing the multi-modal neural encoder by performing incrementally complementary fusion on the photometric features and the geometric features, includes: calculating a photometric peak feature $F^M$ as follows:

$$F^M(u,v,z) = \text{MVSMaxPooling}(F_{i,z}^W(u,v));$$

wherein the MVSMaxPooling calculates a maximum value of the photometric feature at each spatial point, under the reference view;

using a 3D convolutional layer $f^{VC}$ to fuse the original RGB pixel bodies $F^C$ and the photometric variance feature $F^V$; using a 3D convolutional layer $f^{ML}$ to fuse the photometric peak feature $F^M$ and the geometric feature $F^\Lambda$; generating the multi-modal neural encoder $F^L$ under control of a trainable scaling factor $a^{M\Lambda}$, as follows:

$$F^{VC} = f^{VC}([F^V; F^C]);$$

$$F^{M\Lambda} = f^{M\Lambda}([F^M; F^\Lambda]); \text{ and}$$

$$F^L = F^{VC} + a^{M\Lambda} F^{M\Lambda};$$

wherein the $F^{VC}$ is a fusion feature of the original RGB pixel bodies and the photometric variance feature; the $F^{M\Lambda}$ is a fusion feature of the photometric peak feature and the geometric feature.

In some embodiments, the photometric peak feature $F^M$ comprises voxels; the voxels are separately fused with the geometric features $F^\Lambda$ to form a gating mechanism to filter out noise introduced by non-surface elements in the feature space.

In some embodiments, in the Step 2, converting the multi-modal neural encoder and raw RGB pixel bodies of the unstructured multi-views into the volume density $\sigma$ and the radiation brightness r includes:

constructing a neural radiation field $f^A$; for any 3D position and a view direction unit vector v, learning 3D environmental geometry and appearance information encoded in the multi-modal neural encoder $F^L$; wherein the neural radiation field is converted, through continuous interpolation, from the multi-modal neural encoder $F^L$ and the original RGB pixel bodies $F^C$ of the unstructured multi-views into the corresponding volume density $\sigma$ and the radiation brightness r, as follows:

$$\sigma, r = f^A(x, v, F^L, F^C);$$

wherein the x is standardized device coordinates in the reference view, and the v is a unit vector of the reference view coordinate system; trilinear interpolation is performed on the $F^L$ based on the coordinates x.

In some embodiments, in the Step 3, aggregating context features of the sampled light includes: expressing the light of the camera $r^S(d)$ as:

$$r^S(d) = o + dv;$$

wherein the o is an origin of the light; the d is a distance along a direction of the light; the v is a unit vector along the direction of the light;

sampling the light of the camera layer by layer within a range from a farthest boundary $d_f$ to a nearest boundary $d_n$ of the origin o of the light; wherein the distance between $d_f$ and $d_n$ is divided into $K^D$ intervals, one sample point is randomly selected from each interval; the i-th sample point $d_i$ is expressed as:

$$d_i \sim U\left[d_n + \frac{i-1}{K^D}(d_f - d_n), d_n + \frac{i}{K^D}(d_f - d_n)\right];$$

aggregating, by a transformer residual network, ambient features $F^L$ and the original RGB pixel bodies $F^C$ in the light context information to obtain the light context features FA as follows:

$$F^A = f^{Trans}([F^L; F^C]).$$

In some embodiments, in the step 4, decoding, using the light context features, the volume density and the radiation brightness, includes:

decoding the volume density $\sigma$ and the radiation brightness r point-by-point based on multilayer perceptrons $f_1^{MLP}$, $f_2^{MLP}$, and $f_3^{MLP}$, wherein a decoding process of an i-th sampling point is expressed as follows:

$$F_i^B = f_1^{MLP}(F_i^A, x_i);$$

$$s_i = f_2^{MLP}(F_i^B); \text{ and}$$

$$r_i = f_2^{MLP}(F_i^B, v_i);$$

rendering to generate the free-view RGB-D image comprises: rendering a RGB image C and a depth image D by a differentiable light-stepping algorithm based on the decoded volume density $\sigma$ and the radiation brightness r, wherein an RGB value $C_k$ and a depth value $D_k$ of a k-th pixel are calculated as follows:

$$t_i = \exp\left(-\overset{K^V-1}{\underset{j=1}{a}} s_j\right);$$

$$C_k = \overset{K^V}{\underset{i=1}{a}} t_i(1 - \exp(-s_i \times Vd_i))d_i;$$

and $$D_k = \overset{K^V}{\underset{i=1}{a}} t_i(1 - \exp(-s_i \times Vd_i))d_i;$$

wherein the $t_i$ denotes volumetric light transmittance; the $K^V$ denotes the total number of sampling points on one light ray; the $d_i$ denotes a distance from the i-th sampling point to the origin; the $Vd_i$ denotes a spacing from the i-th sampling point to a point next to the i-th sampling point.

In some embodiments, the sparse geometric supervision is to convert high-confidence sparse point cloud output from a screening algorithm into voxel; a surrounding region is anchored to limit generation of a smooth radiation field; a sparse depth image output from COLMAP is used to construct geometric constraints in a depth image space; the sparse geometric supervision is to use voxels as anchors to expand regions, and a geometric supervision signal $\Lambda$ in a form of heat map is formed; the geometric supervision signal $\Lambda$ is applied to the geometric features $F^\Lambda$ to construct a sparse point cloud loss $l^\Lambda$.

In some embodiments, the photometric supervision is training the neural radiation field $f^A$ to calculate an RGB loss $l^C$. Combining photometric supervision and sparse geometric supervision comprises: calculating a sparse depth loss $l^D$; performing a weighted sum on the RGB loss, the sparse depth loss, and the sparse point cloud loss $l^\Lambda$ to obtain a neural radiation field loss $l^F$:

$$l^F = l^C + l^D l^D + l^\Lambda l^\Lambda,$$

wherein the $l^D$ and the $l^\Lambda$ are weight coefficients.

In the present disclosure, by constructing photometric and geometric features, multi-modal information are incrementally fused in an orderly manner. By sampling light and aggregating light context features, decoding a volume density and a radiance brightness, and performing rendering to generate a free-view RGB-D image. In this way, high-quality 3D reconstruction and 2D rendering are achieved, the problem of shape radiance ambiguity in as few as three unstructured multi-views is solved, advantages of explicit and implicit scene reconstruction are fused together. In the present disclosure, a sparse geometric supervision signal is introduced, and photometric supervision is combined, such that robustness and accuracy of joint appearances and geometric reconstruction are improved. In addition, in the present disclosure, a multi-modal information fusion module of geometric information, photometric information, and semantic information is provided. The multi-modal information fusion module progressively fuses the light context features, such that a generalization capability of the multi-modal neural encoder with a limited number of views is improved.

DETAILED DESCRIPTION

The present disclosure is described below by referring to the accompanying drawings and embodiments, but the description does not limit the present disclosure.

Embodiments

Figure 1:
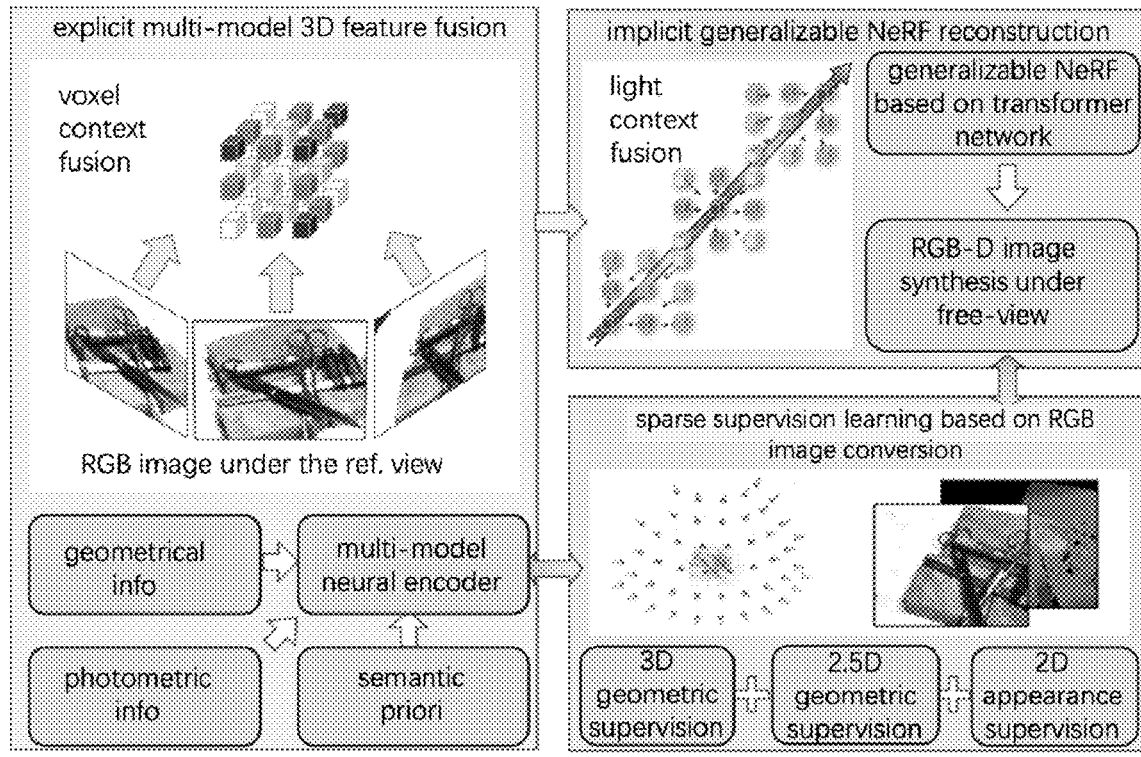
FIG. 1 is a substantial concept of a method according to an embodiment of the present disclosure.
Figure 2:
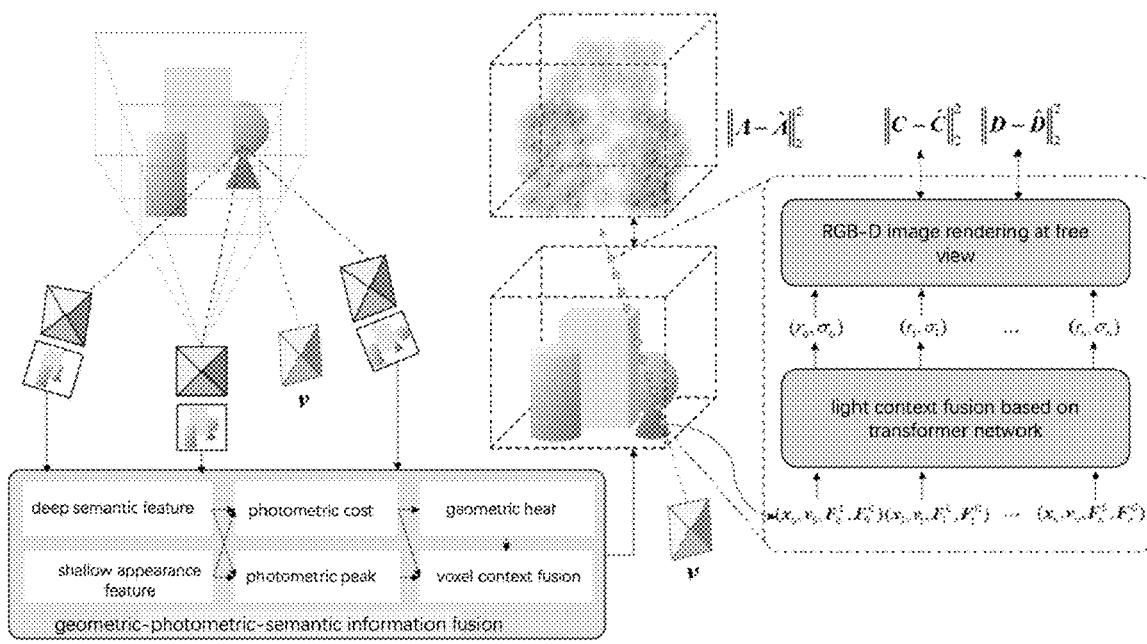
FIG. 2 is a flow chart of the method according to an embodiment of the present disclosure.

A generalizable neural radiation field reconstruction method based on multi-modal information fusion is shown in FIG. 1. Unstructured multi-views $\{I_1, I_2, \ldots, I_n\}$ and corresponding camera parameters $\{\Phi_1, \Phi_2, \ldots, \Phi_n\}$ are provided. A 3D scene reconstruction task is to generate an RGB image C and a depth image D corresponding to each arbitrary views V. For geometric features $F^A$ and photometric features $F_i^T$ that are explicitly constructed based on unstructured multi-views, highly informative multi-modal neural encoders $F^L$ are constructed through progressive complementary fusion. Light is sampled on the basis of the constructed multi-modal neural encoder, light context features are aggregated by a transformer network. A free-view RGB-D image is generated by rendering. Photometric supervision and sparse geometric supervision are combined to guide dense reconstruction of low-texture scenes. A flow chart of the method is shown in FIG. 2.

Specifically, following steps are performed.

Step 1, constructing photometric features and geometric features based on unstructured multi-views, and constructing a multi-modal neural encoder by performing incrementally complementary fusion on the photometric features and the geometric features.

A scene reconstruction technique in the art significantly relies on highly-recognizable feature points and is not sensitive enough to low-texture regions. This is because an underlying neural network is unable to understand a region or a target as a whole from the top to the bottom based on high-level semantic information. The underlying neural network can only discover feature points from low-level texture information from the bottom to the top. Instability of matching based on a small number of view feature points increases reconstruction difficulty.

In order to encode low texture scene features from images of as few as 3 views, a pre-trained deep neural network is introduced to complement overall semantic consistency priori. As few as 2 auxiliary image features are transformed, through a planar scanning pattern, into an optic cone of a reference view. Variance information and peak information of the multi-view features are fused to construct the photometric features $F_i^T$.

Figure 3:
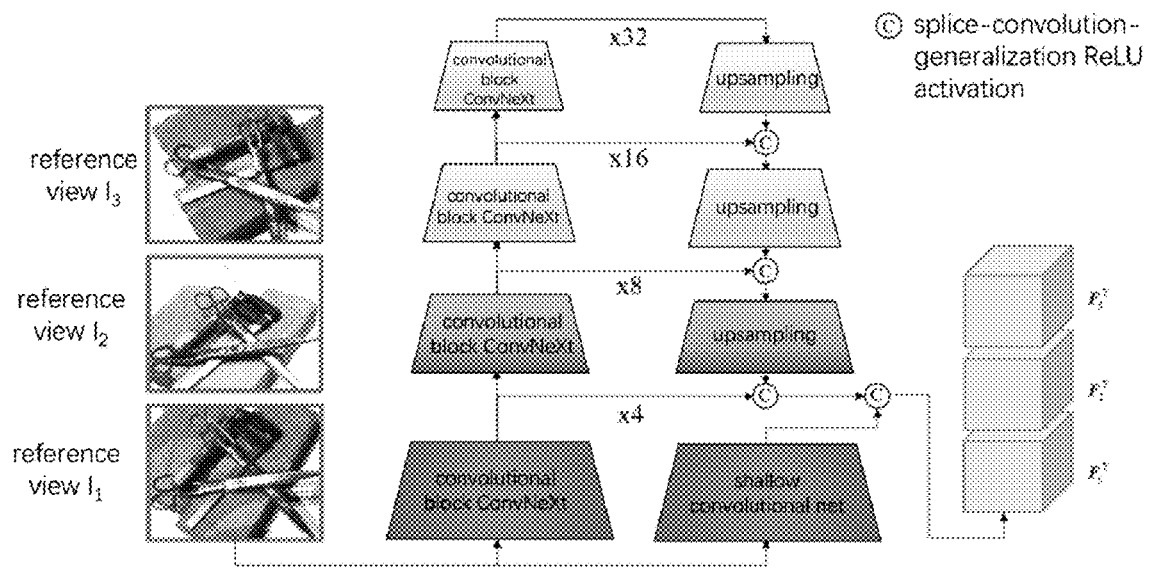
FIG. 3 is a structural schematic view of a bi-directional fusion backbone network according to an embodiment of the present disclosure.

Image features are extracted using a bi-directional fusion backbone network $f^T$ shown in FIG. 3. ImageNet22K is a large image recognition dataset containing 22,000 categories. ConvNeXt is a modern convolutional neural network (CNN) architecture that maintains benefits of traditional CNNs and is introduced with some features of the Transformer model to achieve higher accuracy and efficiency. The ConvNext architecture is configured with larger convolutional kernels, improved network block design, and a simplified network structure to improve performance of the Transformer model. An independent downsampling layer is used in the network to achieve more flexible and efficient spatial downscaling and feature aggregation. ConvNeXt pre-trained on ImageNet22K is used to extract multi-scale semantic information from 4, 8, 16, and 32 times downsampling, overall surface features of the region and the target are provided. An additional 2D CNN is used to extract shallow localized appearance features at the 4 times downsampling. The unstructured multi-views $I_t^{3 \times reateHW}$ are encoded into semantically-enhanced photometric features through the bi-directional feature fusion $$F_i^T \ c^T \text{create} \frac{H}{4} \frac{W}{4}:$$

$$F_i^T = f^T(I_i)$$

In the above equation, the $I_i$ denotes the unstructured multi-views.

The camera parameters $\Phi=[K, R, t]$ are obtained. The K is an internal reference matrix of the camera. The R is a rotation matrix of the camera with respect to a world coordinate system. The t is a translation vector of the camera with respect to the world coordinate system. A homographic transformation matrix $X_i(z)$ is used to transform 2D features of the i-th auxiliary view to the reference view to obtain photometric features $F_{i,z}^T(u, v)$ at the depth of Z:

$$\Xi_i(z) = K_i \cdot \left( R_i \cdot R_1^T + \frac{(t_1 - t_i) \cdot n_i^T}{z} \right) \cdot K_1^{-1}.$$

In the above equation, the $K_i$, $R_i$, and $t_i$ are the camera parameters of the i-th auxiliary view, and the $K_l$, $R_l$, and $t_l$ are the camera of the reference view, and the $n_i$ is a normal direction of the reference view.

$$F_{i,z}^W(u,v) = F_i^T \times (\Xi_i(z)[u,v,l]^T)$$

In the above equation, the u, v, and l are normalized device coordinates in the reference view.

A photometric variance feature $F^V$ based on variance cost metric explicitly encodes an extent of difference between feature points of the multi-views, and specifically, the extent of difference is obtained by performing the following equation:

$$F^V(u,v,z) = \mathrm{Var}(F_{i,z}^T(u,v)).$$

In the above equation, the Var is a variance function that computes the photometric feature for each spatial point in the reference view.

The photometric variance feature $F^V$ is essentially constructed by pixel matching in the multi-views, and some geometric information are implied therein. Accordingly, the 3D CNN is used for encoding and decoding, the photometric variance feature can be converted into explicit geometric feature based on a sigmoid operation.

The sigmoid operation is an S-shaped function, which is common in biology and is also known as an S-shaped growth curve. In information science, due to the S-shaped function being mono-increasing and an inverse function being mono-increasing, the sigmoid function is often used as an activation function for neural networks, and variables are mapped to a range between 0 and 1.

Figure 6:
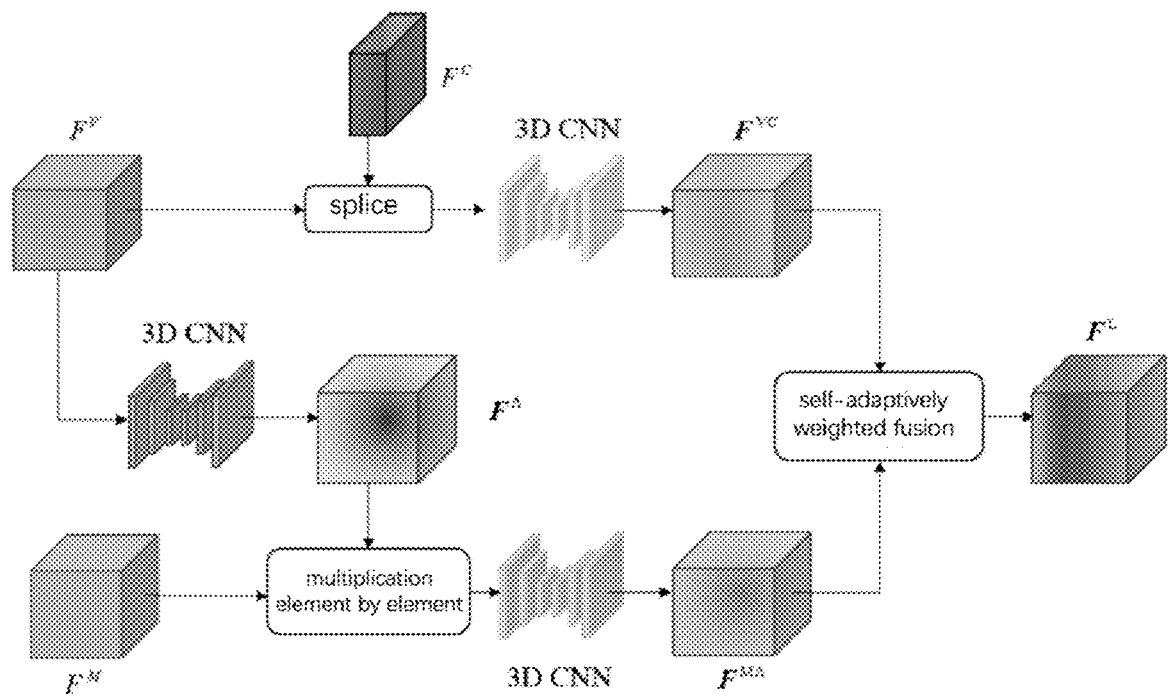
FIG. 6 is a flow chart of fusing and constructing a multi-modal neural coder at low textures according to an embodiment of the present disclosure.

A process as shown in FIG. 6 is used to incrementally fuse the semantically-enhanced photometric feature $F_i^T$ with the geometric feature $F^\Lambda$ to form the multi-modal neural encoder $F^L$ for the low texture environments. The 3D CNN used herein, i.e., a neural network module having a downsampling convolutional layer, an upsampling convolutional layer, and skip connections, can efficiently infer and propagate environmental global information.

In the task of appearance and geometry joint reconstruction, the variance cost feature includes only relative differences between views and cannot provide absolute scale information. A multi-view maximum pooling operation is performed, effective peak information in each view is extracted, such that a photometric peak feature $F^M$ is constructed for encoding the fusion information of complete semantic information and photometric information:

$$F^M(u,v,z) = \mathrm{MVSMaxPooling}(F_{i,z}^T(u,v))$$

MVSMaxPooling calculates a maximum value of the photometric feature at each spatial point, under the reference view.

Figure 4:
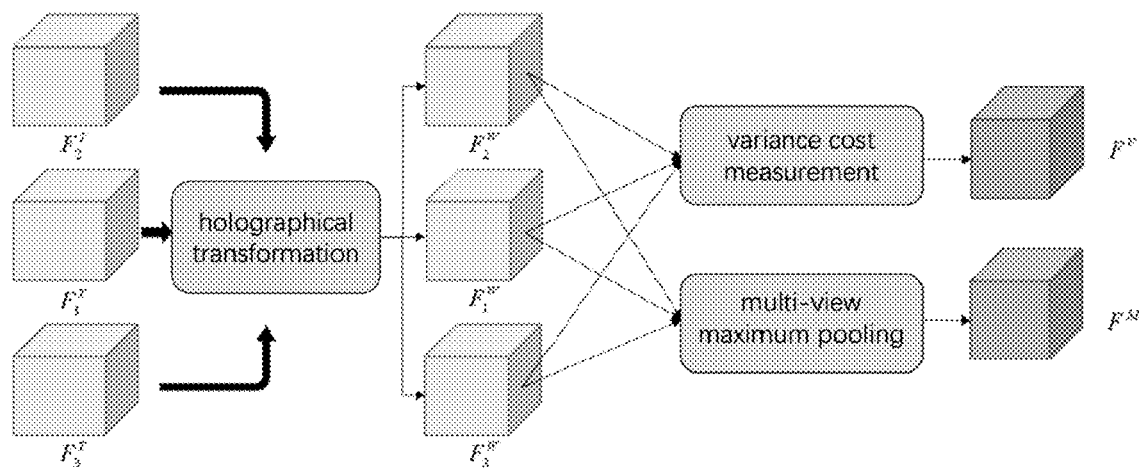
FIG. 4 is a flow chart of constructing photometric variance features and photometric peak features according to an embodiment of the present disclosure.
Figure 5:
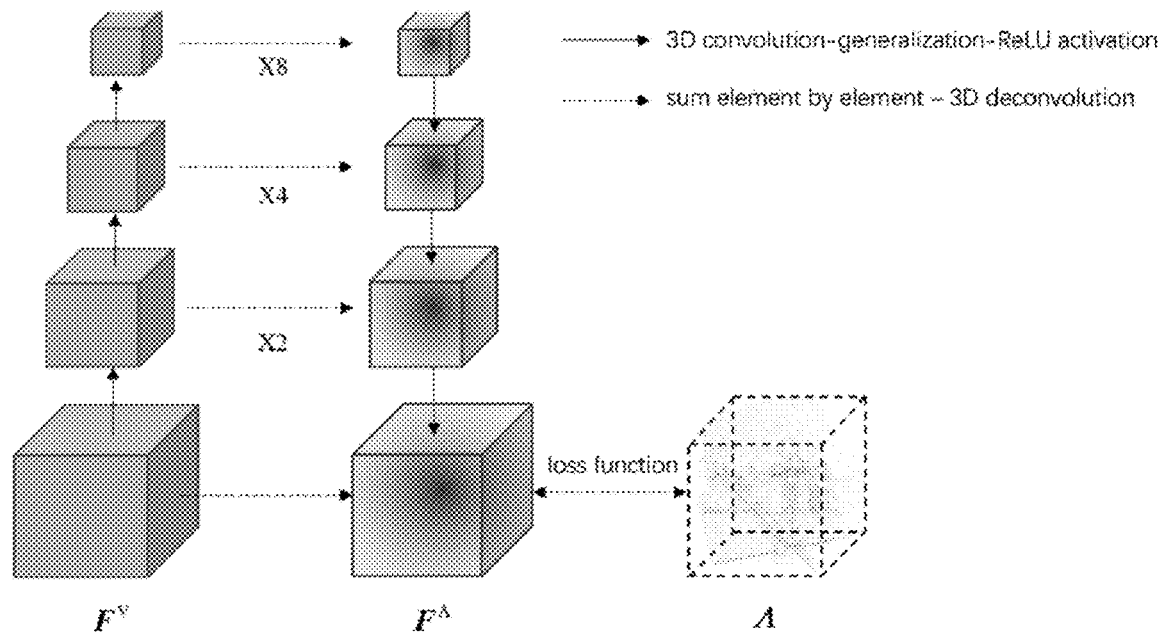
FIG. 5 is a flow chart of constructing geometric features according to an embodiment of the present disclosure.

A process of constructing the photometric variance feature and the photometric peak feature is shown in FIG. 4.

The 3D CNN is a deep learning model, and 3D convolutional kernels are used to extract features in images or video data.

The 3D convolutional layer $f^{VC}$ is used to fuse an original RGB pixel $F^C$ of the unstructured multi-views and the enhanced photometric variance feature $F^V$. The 3D convolutional layer $f^{ML}$ is used to fuse the enhanced photometric peak feature $F^M$ and the geometric feature $F^\Lambda$. Finally, the final multi-modal neural encoder is generated under control of a trainable scaling factor $a^{M\Lambda}$. Specifically, following equations are used for calculation:

$$F^{VC} = f^{VC}([F^V; F^C]);$$

$$F^{M\Lambda} = f^{M\Lambda}([F^M; F^\Lambda]); \text{ and}$$

$$F^L = F^{VC} + a^{M\Lambda} F^{M\Lambda};$$

The enhanced photometric peak feature $F^M$ includes a large number of meaningless voxels. When the voxels are located on a surface of an object, peak features can be used to complement absolute-scaled photometric clues. When the voxels are located elsewhere in space that are not on the surface, peaks from the multi-view features do not have effective meanings. When the voxels are separately fused with the geometric features $F^\Lambda$ carrying information of the surface of the object, a gating mechanism is formed to filter out noise introduced by non-surface elements in the feature space. However, the model has not finished learning a sparse point cloud at an early stage of training, and at this moment, the geometric feature $F^\Lambda$ itself has much noise. Therefore, an initial value of the scaling factor is set to 0, and value ratios of the two photometric peak features $F^M$ to the geometric feature $F^\Lambda$ can be adaptively evaluated by reverse propagation in subsequent training.

Step 2, the multi-modal neural encoder and raw RGB pixel bodies of the unstructured multi-views are converted a volume density and radiation brightness.

For traditional scene reconstruction, 3D scenes are explicitly characterized as a point cloud or voxels. The characterization is not sufficiently fine and is texture-unfriendly. The neural radiation field $f^A$ takes a neural network to implicitly characterize the geometry and the appearance of the environment. Dense RGB-D images of the 3D environment are rendered based on physics, however, accuracy of depth images is extremely low. In addition, the original neural radiation field $f^A$ needs to be trained with a large number of multi-view images, which may be tens to hundreds of images, and only 3D reconstruction of a single environment can be performed. A network obtained through a long time of optimization cannot be generalized to new environments. In some researches, generic image features encoded by the convolutional network are used, such that a generalization capability of the neural radiation field $f^A$ is extended, however, the nature of implicit learning causes poor quality during cross-scene geometric reconstruction.

After pre-training using image data of multiple scenes, a time-consuming optimization process can be omitted in new environments, fast 3D reconstruction can be performed by using as few as 3 images. Being different from previous work, in the present disclosure, the model combines advantages of high information content of explicit geometric information, photometric information and semantic information and smoothing properties of implicit learning, more accurate characterization for low-texture environments having a small number of views can be generated. For any 3D position x and a view direction unit vector v, the neural radiation field $f^A$ is regressed from the multi-modal neural encoder $F^L$ and the original RGB pixel bodies $F^C$ of the unstructured multi-views to the corresponding volume density $\sigma$ and the radiation brightness r, which are expressed by the following equation:

$$\sigma, r = f^A(x, v, F^L, F^C).$$

In the above equation, the x is standardized device coordinates in the reference view, and the v is the unit vector of the reference view coordinate system. Trilinear interpolation is performed on the $F^L$ based on the coordinates x.

In order to enhance high-frequency details in the reconstruction result, position encoding is applied to convert the (x, v) into high-frequency characterization. In addition, in order to provide relative positions of sampling points for the subsequent transformer network, position encoding is also applied to ($F^L$, $F^C$). The multi-modal neural encoder $F^L$ has a relatively low resolution after 4 times downsampling. The original RGB pixel bodies $F^C$ of the unstructured multi-views can provide more high-frequency appearance information.

Step 3, sampling light on the basis of the constructed multi-modal neural encoder, aggregating context features of the sampled light based on the transformer network to obtain the light context features.

Since the used 3D CNN used has a regionally large receptive field, the reconstruction result of the multi-modal neural encoder $F^L$ during fusion is overly smooth. A rendering process of the RGB image and the depth image is achieved by tracking light of a virtual camera. The light is discretized and is aligned with pixel points. Therefore, at this stage, separate aggregation of the light context information provides a finer effect, the volume density $\sigma$ is improved and accuracy of regression is improved.

Figure 7:
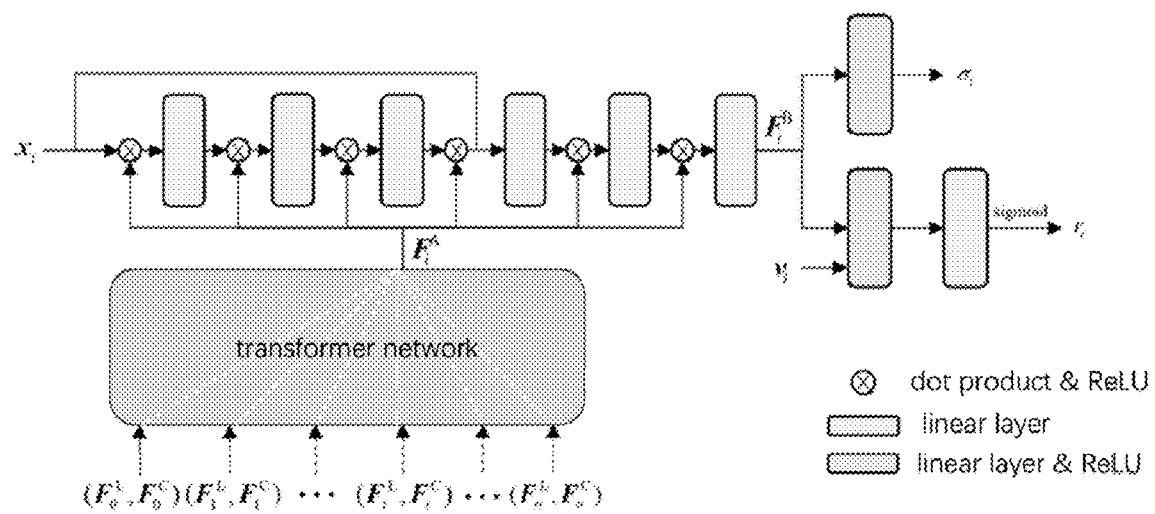
FIG. 7 is a structural schematic view of a light context aggregation module according to an embodiment of the present disclosure.

A light context aggregation module shown in FIG. 7 constructs a neural radiation field $f^A$ to learn the geometry information and the appearance information of the 3D environment encoded in the multi-modal neural encoder $F^L$. The geometry information and the appearance information are converted, through successive interpolation, to the volume density and the radiation brightness r related to views. The light of the camera $r^S(d)$ is expressed as:

$$r^S(d) = o + dv.$$

In the above equation, the o is an origin of the light. The d is a distance along a direction of the light. The v is a unit vector along the direction of the light. A farthest boundary and a nearest boundary of the origin of the light are $d_f$ and $d_n$, respectively.

In order to aggregate the light context information, the camera light are firstly sampled layer by layer. The distance between $d_f$ and $d_n$ is divided into $K^D$ intervals. One sample point is randomly selected from each interval. The i-th sample point $d_i$ can be expressed as:

$$d_i \sim U\left[d_n + \frac{i-1}{K^D}(d_f - d_n), d_n + \frac{i}{K^D}(d_f - d_n)\right].$$

Subsequently, the ambient features $F^L$ and the original RGB pixel bodies $F^C$ in the light context are aggregated by a transformer residual network to obtain the light context features $F^A$:

$$F^A = f^{Trans}([F^L; F^C]).$$

Step 4, decoding the volume density and the radiation brightness using the light context features, rendering to generate the free-view RGB-D image based on the decoded volume density and the radiation brightness, and guiding dense reconstruction of the low-texture scene by combining photometric supervision and sparse geometric supervision.

Based on a multilayer perceptron $f_1^{MLP}$, $f_2^{MLP}$, and $f_3^{MLP}$ to decode the volume density $\sigma$ and the radiation brightness r point-by-point. A decoding process of the i-th sampling point can be expressed as follows:

$$F_i^B = f_1^{MLP}(F_i^A, x_i);$$

$$s_i = f_2^{MLP}(F_i^B); \text{ and}$$

$$r_i = f_2^{MLP}(F_i^B, v_i);$$

Due to presence of shape radiation ambiguity, a radiation field that simply satisfies RGB constraints does not guarantee a correct geometrical structure. Especially in low-texture environments, the reconstructed geometrical structure often have severe deviations. A geometric constraint built in a 3D voxel space is introduced to limit generation of smooth radiation fields by cloud-anchoring a surrounding region with sparse key points. Due to performing a series of downsampling, a resolution of the 3D voxel space is lower than the original image. Therefore, the geometric constraint is limited. In order to obtain accurate reconstruction results at high resolution, a sparse depth image output from COLMAP is used to further construct the geometric constraint of the depth image space.

For the neural radiation field $f^A$, a voxel rendering process based on physics is applied, the RGB image and the depth image are rendered by a differentiable light-stepping algorithm. An RGB value and $C_k$ and a depth value Dk of the k-th pixel can be calculated by the following equation.

$$t_i = \exp\left(-\overset{K^V}{\underset{i=1}{a}} s_i\right);$$

and $$C_k = \overset{K^V}{\underset{i=1}{a}} t_i(1 - \exp(-s_i \times Vd_i))r_i;$$

$$D_k = \overset{K^V}{\underset{i=1}{a}} t_i(1 - \exp(-s_i \times Vd_i))d_i.$$

In the above equation, the $t_i$ denotes volumetric light transmittance. The $K^V$ denotes the total number of sampling points on one light ray. The di denotes a distance from the i-th sampling point to the origin. The $Vd_i$ denotes a spacing from the i-th sampling point to a point next to the i-th sampling point.

The overall network model is trained in an end-to-end mode. An L2 loss function is used during training to calculate a RGB loss $l^C$. A smoothed L1 loss function is used to calculate a sparse depth loss $l^D$. A weighted sum is performed on the RGB loss, the sparse depth loss, and a sparse point cloud loss $l^A$ to obtain a neural radiation field loss $l^F$:

In the above equation, the $l^D$ and the $l^A$ are weight coefficients.

Scene appearance reconstruction experiments are performed on a DTU dataset and an LLFF dataset. Depth reconstruction experiments are performed on the DTU dataset. The DTU dataset includes some low-textured scenes. Each scene has 49 views. Each view includes seven types of light radiation. Data setup is consistent with literatures in the art. 88 scene data on the DTU dataset are used to train the proposed generalizable neural radiation field, 16 scene data are used for testing, and RGB-D images of 512×640 resolution are used. The LLFF dataset includes some low-textured and light-reflective environments. Each environment has RGB images of 20 views. The dataset has a different distribution from the DTU training set. In total, 8 environments are used for testing. For each test environment, 7 nearby views are selected, 3 of the 7 nearby views are used as inputs, and the remaining 4 of the 7 nearby views are used to evaluate performance of the model.

A true value image I and a generated image Î are provided. PSNR, SSIM and LPIPS are used in experiments to evaluate the performance of the model in generating RGB images under a new view.

The PSNR is a peak signal-to-noise ratio and is defined based on a mean square error MSE. As the PSNR is greater, image distortion is reduced. The PSNR is calculated as follows:

$$MSE = \frac{1}{HW}\sum_{i=0}^{H}\sum_{j=0}^{W}\|I(i,j) - \hat{I}(i,j)\|^2;$$

and $$PSNR = 10 \times \log_{10}\left(\frac{255^2}{MSE}\right).$$

In the above equations, the SSIM is a structural similarity index, which mimics a human visual system and quantifies localized structural similarity in terms of brightness, contrast and structural similarity. As the SSIM is greater, the image distortion is less. The SSIM is calculated as follows:

$$SSIM = \frac{(2\mu_I\mu_{\hat{I}} + \varepsilon_1)(2\sigma_{I\hat{I}} + \varepsilon_2)}{(\mu_I^2 + \mu_{\hat{I}}^2 + \varepsilon_1)(\sigma_I^2 + \sigma_{\hat{I}}^2 + \varepsilon_2)}.$$

In the above equation, the $\mu_I$ and the $\mu_{\hat{I}}$ denote a mean of the I and a mean of the Î, respectively. The $\sigma_I^2$ and the $\sigma_{\hat{I}}^2$ denote a variance of the I and a variance of the Î, respectively. The $\varepsilon_1$ and the $\varepsilon_2$ are constants for stability, preventing a case where a denominator is zero.

The LPIPS is the learned perceptual image block similarity, which uses a L2 distance of image depth features to measure similarity of an image pair. The LPIPS can better reflect human perception than PSNR and SSIM. As the LPIPS is less, image distortion is less.

The Abs err is an average absolute error, which is obtained by averaging absolute depth errors of all pixels in meters. The Acc is a threshold percentage. Acc (0.01) indicates a percentage of pixels having an absolute depth error less than 0.01 meters. Acc (0.05) indicates a percentage of pixels having an absolute depth error less than 0.05 meters.

In the experiment, the number of planar scanning is set to 128. The number of randomly sampled light rays in one sampling is 1024. Multi-task loss weights $1^D$ and $1^A$ are set to 2 and 1. The model is trained on a server configured with a single NVIDIA Titan RTX GPU using an Adam optimizer. An initial learning rate is $5e^{-4}$. The learning rate is dynamically adjusted based on a cosine annealing strategy. Optimal performance can be achieved after 15 cycles.

In the present disclosure, by constructing photometric and geometric features, multi-modal information are incrementally fused in an orderly manner. By sampling light and aggregating light context features, decoding a volume density and a radiance brightness, and performing rendering to generate a free-view RGB-D image. In this way, high-quality 3D reconstruction and 2D rendering are achieved, the problem of shape radiance ambiguity in as few as three unstructured multi-views is solved, advantages of explicit and implicit scene reconstruction are fused together. In the present disclosure, a sparse geometric supervision signal is introduced, and photometric supervision is combined, such that robustness and accuracy of joint appearances and geometric reconstruction are improved. In addition, in the present disclosure, a multi-modal information fusion module of geometric information, photometric information, and semantic information is provided. The multi-modal information fusion module progressively fuses the light context features, such that a generalization capability of the multi-modal neural encoder with a limited number of views is improved.

Control Embodiments

For appearance reconstruction metrics of the LLFF and DTU test datasets, Table 1 and Table 2 compare the proposed method with other generalizable baseline methods, including PixelNeRF, IBRNet, and MVSNeRF. The PixelNeRF discretely fuses multi-view features through average pooling operations. However, overfitting problems occur for cross-scene training, and therefore, the PixelNeRF cannot be generalized to the LLFF environments. The IBRNet performs feature aggregation along light rays, RGB appearance reconstruction performance of generalized environments is dramatically improved, feature aggregation is limited to 2D images with 3D light rays. Therefore, for IBRNet, perceptual similarity of the generated 3D space is low. The MVSNeRF uses the 3D CNN to aggregate full-environmental features on cost bodies, however, lack of perception in regions and targets causes noise to be introduced to the rendering process.

TABLE 1

Quantitative results of fusion of a new view based on the LLFF dataset

| Comparison method | PSNR↑ | SSIM↑ | LPIPS↓ |
| --- | --- | --- | --- |
| PixelNeRF | 11.24 | 0.486 | 0.671 |
| IBRNet | 21.79 | 0.786 | 0.279 |
| MVSNeRF | 21.93 | 0.795 | 0.252 |
| Model of the present disclosure | 22.22 | 0.816 | 0.247 |

TABLE 2

Quantitative results of fusion of a new view based on the LLFF dataset

| Comparison method | Is tested scene image used? | PSNR↑ | SSIM↑ | LPIPS↓ |
|---|---|---|---|---|
| PixelNeRF | x | 19.31 | 0.789 | 0.382 |
| IBRNet | x | 26.04 | 0.917 | 0.190 |
| MVSNeRF | x | 26.03 | 0.931 | 0.168 |
| NeRF | Optimization for 10.2 hours (iteration for 200 k times) | 26.63 | 0.902 | 0.263 |
| Method of the present disclosure | x | 27.13 | 0.937 | 0.156 |

The results of the quantitative comparison experiments show that the method in the present disclosure significantly outperforms the baseline method on both datasets. The PSNR, the SSIM, and the LPIPS are increased by 1.6%, 1.6%, and 4.6%, respectively. Therefore, a strategy combining multi-feature fusion and light context aggregation can fuse the 3D environmental context information more properly to generate a more fined new-view image. The LPIPS is improved the most, indicating that photometric features with augmented semantic priori extract effective semantic perceptual information through bi-directional encoding, providing richer semantic knowledge for environmental generalization of the neural radiation field. In particular, the method complements unfair comparison with the original NeRF, which belongs to a non-generalizable offline optimization method, using a full volume of test scene images for training for 10.2 h with optimization of about 200 k times of iterations. Notably, without using test scene images for optimization, the method in the present disclosure outperforms the NeRF method in all indicators, validating that the high-quality generalized NeRF method is feasible.

Geometric reconstruction indicators of the reference views and the new views are categorized into two main groups. For the DTU test dataset, Table 3 compares the method of the present disclosure with other generalizable baseline methods, including neural radiation field methods PixelNeRF, IBRNet, and MVSNeRF, and the classical multi-view deep neural network method. The method in the present disclosure, being similar to the other neural radiation field methods, has RGB images as the only input data, and the new view can be arbitrarily selected for geometric reconstruction. The MVSNet is trained using real depth images, however, only depth of the reference view can be reconstructed.

The results of quantitative comparison experiments show that the method of the present disclosure substantially outperforms all baseline methods, both for the input view and the new view. When only three input images are used, a reconstruction Abs err in the reference view is 1 cm. Compared to the generalizable neural radiation field model in the art, the Abs err is reduced by 56.5%, and the Acc(0.01) is increased by 13.5%. In addition, the reconstruction performance for the new views is increased to a larger extent, the Abs err is reduced by 62.9%, and the Acc(0.01) is increased by 18.4%.

To be noted that, unlike MVSNet which uses real labeled dense depth images, only sparse key points reconstructed by SFM are used in the neural radiation field method in the present disclosure, the geometric supervision at the both voxels and the light is used to achieve high-quality depth reconstruction. In generalized neural networks, this is the first time that the neural radiation field model achieves overall better performance than the multi-view stereo network, the Abs err of reconstruction in the reference view is reduced by 44.4%.

Figure 8:
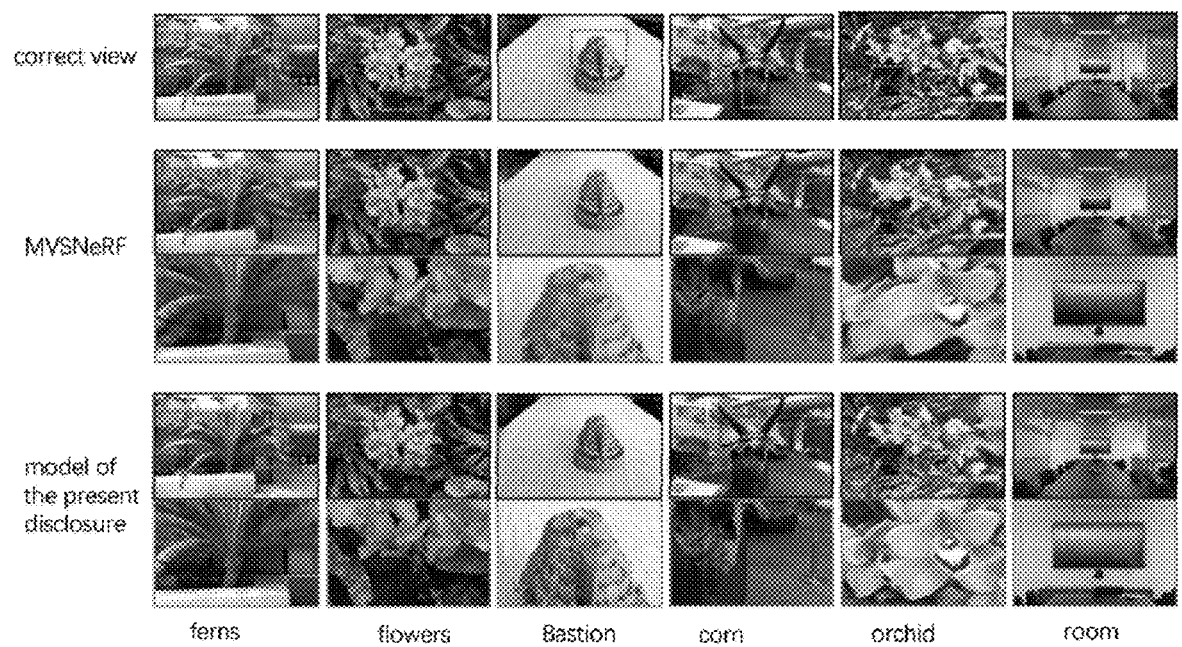
FIG. 8 is an example of an RGB appearance reconstruction result on the LLFF dataset according to an embodiment of the present disclosure.

FIG. 8 shows an example of RGB appearance reconstruction results on the LLFF dataset and qualitatively compares the method in the present disclosure with the baseline method MVSNeRF in the art. The results show that flickering and artifacts can be observed in the image generated based on MVSNeRF. However, the method of the present disclosure is better adapted to environments with different distributions, proving that the method of the present disclosure is highly generalizable. In light-reflective low-texture regions, such as TV screens and brightly painted desktops, highlight effects generated by the method of the present disclosure significantly change as views move, brightness and shapes are more realistic. Therefore, the feature fusion and the light aggregation strategy in the present disclosure can effectively assist the radiation field model in understanding anisotropy of light reflective surfaces.

Figure 9:
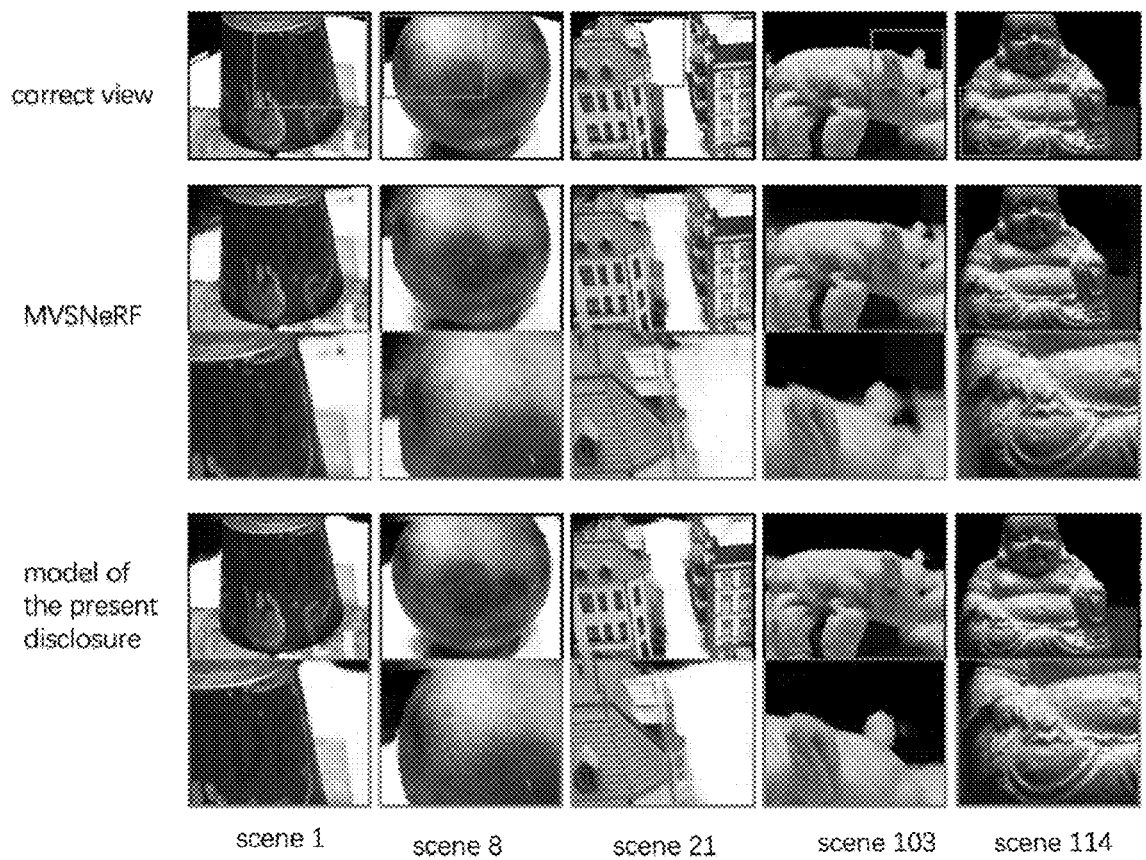
FIG. 9 is an example of an RGB appearance reconstruction result on the DTU dataset according to an embodiment of the present disclosure.

FIG. 9 shows an example of RGB appearance reconstruction results on the DTU dataset, and qualitatively compares the method of the present disclosure with the baseline method MVSNeRF in the art. The results generated by the method of the present disclosure for the free-view of low-texture environments have strong advantages. Inside the low texture region, both methods can generate reasonable new view results. However, at edges of the low-texture region, the result generated from the MVSNeRF have obvious artifacts, whereas the result generated by the method of the present disclosure have clear and sharp boundaries. It indicates that the neural radiation field model, which incorporates semantic priori and sparse key point cloud information,

TABLE 3

Quantitative results of fusion of a new view based on the DTU dataset

| Comparison method | Is real depth used or not? | Reference view | | | New view | | |
|---|---|---|---|---|---|---|---|
| | | Abs err↓ | Acc(0.01)↑ | Acc(0.05)↑ | Abs err↓ | Acc(0.01)↑ | Acc(0.05)↑ |
| PixelNeRF | x | 0.245 | 0.037 | 0.176 | 0.239 | 0.039 | 0.187 |
| IBRNet | x | 1.69 | 0.000 | 0.000 | 1.62 | 0.000 | 0.001 |
| MVSNeRF | x | 0.023 | 0.746 | 0.913 | 0.035 | 0.717 | 0.866 |
| MVSNet | ✓ | 0.018 | 0.603 | 0.955 | — | — | — |
| Model of the present disclosure | x | 0.010 | 0.847 | 0.969 | 0.13 | 0.849 | 0.960 | has a certain overall target-awareness capability. Even when a small number of views are input, boundary regions in the 3D space can be effectively defined, improving rendering quality of new views.

Figure 10:
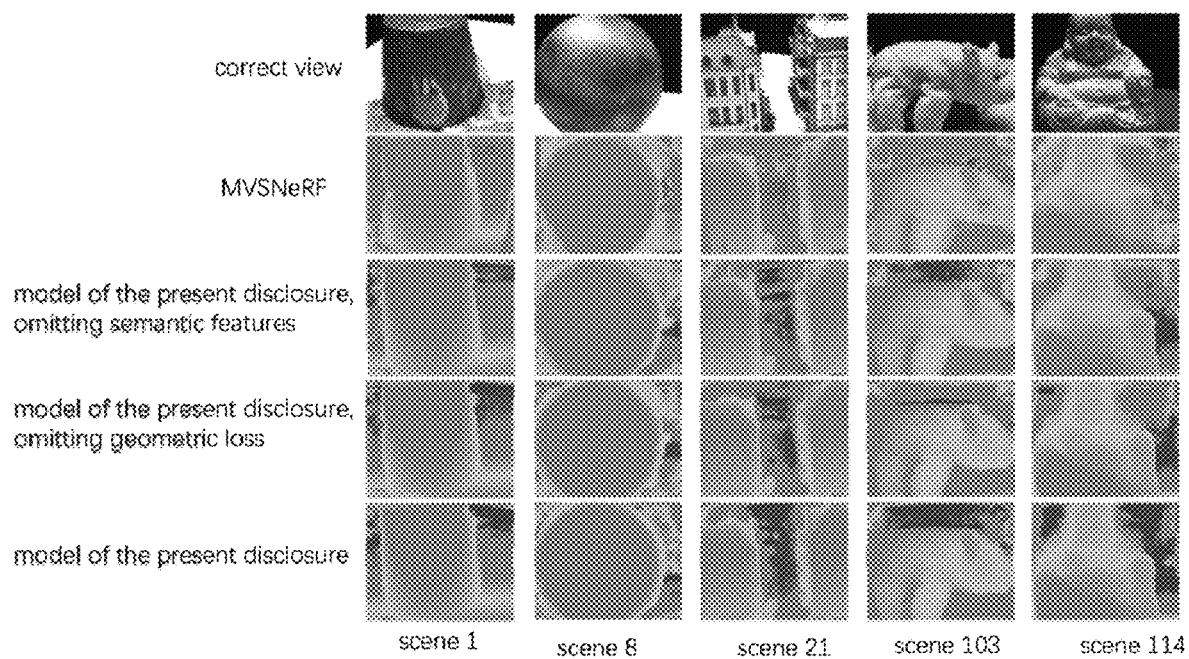
FIG. 10 is an example of a deep reconstruction result on the DTU dataset according to an embodiment of the present disclosure.

FIG. 10 shows an example of depth reconstruction results on the DTU dataset, and qualitatively compares the method of the present disclosure with the generalizable neural radiation field method MVSNeRF in the art. Visualizable results show that the MVSNeRF fails to solve the shape radiation ambiguity of the neural radiation field, reconstruction results of the MVSNeRF include a large amount of background noise, edges of an object are blurred, and the reconstruction accuracy of overall surfaces tends to be smoothed due to being affected by the feature resolution. The method in the present disclosure extracts effective features from low texture surfaces, robust key points are anchored to emphasize edge information at the boundaries of the object, such that shape radiation ambiguity of the neural radiation field is solved.

In summary, according to the present disclosure, shape radiation ambiguity is solved, and high-quality 3D reconstruction and 2D rendering are achieved, and surface reconstruction accuracy of the generalized neural radiation field is improved.

What is claimed is:

1. A generalizable neural radiation field reconstruction method based on multi-modal information fusion, comprising:
   Step 1, constructing photometric features and geometric features based on unstructured multi-views, and constructing a multi-modal neural encoder by performing incrementally complementary fusion on the photometric features and the geometric features;
   Step 2, converting the multi-modal neural encoder and raw Red-Green-Blue (RGB) pixel bodies of the unstructured multi-views into a volume density and radiation brightness;
   Step 3, sampling light on the basis of the constructed multi-modal neural encoder, aggregating context features of the sampled light based on a transformer network to obtain light context features; and
   Step 4, decoding, using the light context features, the volume density and the radiation brightness; rendering, based on the decoded volume density and the radiation brightness, to generate a free-view Red-Green-Blue-Depth (RGB-D) image; and guiding dense reconstruction of a low-texture scene by combining photometric supervision and sparse geometric supervision;
   wherein, in the Step 1, constructing the photometric features comprises:
     using a bi-directional fusion backbone network $f^T$ to extract image features;
     using Convolutional Next-generation (ConvNeXt) to extract multi-scale semantic information from 4, 8, 16, and 32 times downsampling, wherein the multi-scale semantic information provides overall surface features of a region and a target;
     extracting shallow localized appearance features at the 4 times downsampling;
     encoding the unstructured multi-views into semantically-enhanced photometric features $F_i^T$ through bi-directional feature fusion, wherein the semantically-enhanced photometric features $F_i^T$ is as follows:

$$F_i^T = f^T(I_i);$$

wherein the Ii denotes the unstructured multi-views.

2. The generalizable neural radiation field reconstruction method according to claim 1, wherein constructing the geometric features comprises:
   obtaining camera parameters $\Phi = [K, R, t]$, wherein the K is an internal reference matrix of a camera, the R is a rotation matrix of the camera with respect to a world coordinate system, the t is a translation vector of the camera with respect to the world coordinate system; using a homographic transformation matrix $X_i(z)$ to transform 2D features of an i-th auxiliary view to a reference view to obtain photometric features $F_{i,z}^T(u, v)$ at a depth of Z, as follows:

$$\Xi_i(z) = K_i \cdot \left( R_i \cdot R_1^T + \frac{(t_1 - t_i) \cdot n_i^T}{z} \right) \cdot K_1^{-1};$$

wherein the $K_i$, the $R_i$, and the $t_i$ are the camera parameters of the i-th auxiliary view, and the $K_1$, the $R_1$, and the $t_1$ are the camera parameters of the reference view, and the $n_i$ is a normal direction of the reference view;

$$F_{i,z}^W(u,v) = F_i^T \times (\Xi(z)[u,v,1]^T)$$

wherein the u, the v, and the 1 are normalized device coordinates in the reference view;
a photometric variance feature $F^V$ is calculated to explicitly encode an extent of difference between feature points of the multi-views, as follows:

$$F^V(u,v,z) = \text{Var}(F_{i,z}^W(u,v));$$

wherein the Var is a variance function that computes the photometric feature for each spatial point in the reference view;
using a 3D convolutional neural network (CNN) to encode and decode the photometric variance feature $F^V$, wherein the photometric variance feature $F^V$ is converted into an explicit geometric feature $F^\Lambda$ based on a sigmoid operation.

3. The generalizable neural radiation field reconstruction method according to claim 2, wherein, in the Step 1, constructing the multi-modal neural encoder by performing incrementally complementary fusion on the photometric features and the geometric features, comprises:
   calculating a photometric peak feature $F^M$ as follows:

$$F^M(u,v,z) = \text{MVSMaxPooling}(F_{i,z}^W(u,v));$$

wherein the MVSMaxPooling calculates a maximum value of the photometric feature at each spatial point, under the reference view;
using a 3D convolutional layer $f^{VC}$ to fuse the original RGB pixel bodies $F^C$ and the photometric variance feature $F^V$; using a 3D convolutional layer $f^{ML}$ to fuse the photometric peak feature $F^M$ and the geometric feature $F^\Lambda$; generating the multi-modal neural encoder $F^L$ under control of a trainable scaling factor $a^{M\Lambda}$, as follows:

$$F^{VC} = f^{VC}([F^V; F^C]);$$

$$F^{M\Lambda} = f^{M\Lambda}([F^M; F^\Lambda]);\text{ and}$$

$$F^L = F^{VC} + a^{M\Lambda} F^{M\Lambda};$$

wherein the $F^{VC}$ is a fusion feature of the original RGB pixel bodies and the photometric variance feature; the $F^{M\Lambda}$ is a fusion feature of the photometric peak feature and the geometric feature.

4. The generalizable neural radiation field reconstruction method according to claim 3, wherein the photometric peak feature $F^M$ comprises voxels; the voxels are separately fused with the geometric features $F^A$ to form a gating mechanism to filter out noise introduced by non-surface elements in the feature space.

5. The generalizable neural radiation field reconstruction method according to claim 3, wherein, in the Step 2, converting the multi-modal neural encoder and raw RGB pixel bodies of the unstructured multi-views into the volume density σ and the radiation brightness r comprises:
constructing a neural radiation field $f^A$; for any 3D position and a view direction unit vector v, learning 3D environmental geometry and appearance information encoded in the multi-modal neural encoder $F^L$; wherein the neural radiation field is converted, through continuous interpolation, from the multi-modal neural encoder $F^L$ and the original RGB pixel bodies $F^C$ of the unstructured multi-views into the corresponding volume density σ and the radiation brightness r, as follows:

$$\sigma, r = f^A(x, v, F^L, F^C);$$

wherein the x is standardized device coordinates in the reference view, and the v is a unit vector of the reference view coordinate system; trilinear interpolation is performed on the $F^L$ based on the coordinates x.

6. The generalizable neural radiation field reconstruction method according to claim 5, wherein, in the Step 3, aggregating context features of the sampled light comprises:
expressing the light of the camera $r^S(d)$ as:

$$r^S(d) = o + dv;$$

wherein the o is an origin of the light; the d is a distance along a direction of the light; the v is a unit vector along the direction of the light;
sampling the light of the camera layer by layer within a range from a farthest boundary $d_f$ to a nearest boundary $d_n$ of the origin o of the light; wherein the distance between $d_f$ and $d_n$ is divided into $K^D$ intervals, one sample point is randomly selected from each interval; the i-th sample point $d_i$ is expressed as:

$$d_i \sim U\left[d_n + \frac{i-1}{K^D}(d_f - d_n), d_n + \frac{i}{K^D}(d_f - d_n)\right];$$

aggregating, by a transformer residual network, ambient features $F^L$ and the original RGB pixel bodies $F^C$ in the light context information to obtain the light context features FA as follows:

$$F^A = f^{Trans}([F^L; F^C]).$$

7. The generalizable neural radiation field reconstruction method according to claim 6, wherein, in the step 4, decoding, using the light context features, the volume density and the radiation brightness, comprises:
decoding the volume density σ and the radiation brightness r point-by-point based on multilayer perceptrons $f_1^{MLP}$, $f_2^{MLP}$, and $f_3^{MLP}$, wherein a decoding process of an i-th sampling point is expressed as follows:

$$F_i^B = f_1^{MLP}(F_i^A, x_i);$$

$$s_i = f_2^{MLP}(F_i^B); \text{ and}$$

$$r_i = f_2^{MLP}(F_i^B, v_i);$$

rendering to generate the free-view RGB-D image comprises: rendering a RGB image C and a depth image D by a differentiable light-stepping algorithm based on the decoded volume density σ and the radiation brightness r, wherein an RGB value $C_k$ and a depth value $D_k$ of a k-th pixel are calculated as follows:

$$t_i = \exp\left(-\overset{K^V-1}{\underset{i=1}{a}} s_j\right);$$

$$C_k = \overset{K^V}{\underset{i=1}{a}} t_i(1 - \exp(-s_i ? Vd_i))r_i;$$

and $$D_k = \overset{K^V}{\underset{i=1}{a}} t_i(1 - \exp(-s_i ? Vd_i))d_i;$$

wherein the $t_i$ denotes volumetric light transmittance; the $K^V$ denotes the total number of sampling points on one light ray; the $d_i$ denotes a distance from the i-th sampling point to the origin; the $Vd_i$ denotes a spacing from the i-th sampling point to a point next to the i-th sampling point.

8. The generalizable neural radiation field reconstruction method according to claim 4, wherein the sparse geometric supervision is to convert high-confidence sparse point cloud output from a screening algorithm into voxel; a surrounding region is anchored to limit generation of a smooth radiation field; a sparse depth image output from Collection of Large-scale Matching and Preconstruction Tools (COLMAP) is used to construct geometric constraints in a depth image space; the sparse geometric supervision is to use voxels as anchors to expand regions, and a geometric supervision signal Λ in a form of heat map is formed; the geometric supervision signal Λ is applied to the geometric features $F^A$ to construct a sparse point cloud loss $l^A$.

9. The generalizable neural radiation field reconstruction method according to claim 8, wherein the photometric supervision is training the neural radiation field $f^A$ to calculate an RGB loss $l^C$; and
combining photometric supervision and sparse geometric supervision comprises: calculating a sparse depth loss $l^D$; performing a weighted sum on the RGB loss, the sparse depth loss, and the sparse point cloud loss $l^A$ to obtain a neural radiation field loss $l^F$:

$$l^F = l^C + l^D l^D + l^A l^A;$$

wherein the $l^D$ and the $l^A$ are weight coefficients.

* * * * *